(12) United States Patent
Hsu

(10) Patent No.: US 11,653,736 B2
(45) Date of Patent: May 23, 2023

(54) BIODEGRADABLE HAIR ORNAMENT

(71) Applicant: Kuo-Yang Hsu, Tainan (TW)

(72) Inventor: Kuo-Yang Hsu, Tainan (TW)

( * ) Notice: Subject to any disclaimer, the term of this patent is extended or adjusted under 35 U.S.C. 154(b) by 583 days.

(21) Appl. No.: 16/783,459

(22) Filed: Feb. 6, 2020

(65) Prior Publication Data

US 2021/0244152 A1   Aug. 12, 2021

(51) Int. Cl.
| | |
|---|---|
| *A45D 8/20* | (2006.01) |
| *C08L 67/04* | (2006.01) |
| *C08L 33/04* | (2006.01) |
| *C08G 63/183* | (2006.01) |
| *C08K 3/36* | (2006.01) |
| *B29C 45/00* | (2006.01) |
| *C08K 3/26* | (2006.01) |
| *A45D 8/00* | (2006.01) |
| *C08L 67/00* | (2006.01) |
| *A45D 8/36* | (2006.01) |
| *C08K 3/34* | (2006.01) |
| *C08L 67/02* | (2006.01) |
| *C08L 67/03* | (2006.01) |

(52) U.S. Cl.
CPC ............ *A45D 8/20* (2013.01); *B29C 45/0001* (2013.01); *C08G 63/183* (2013.01); *C08K 3/26* (2013.01); *C08K 3/36* (2013.01); *C08L 33/04* (2013.01); *C08L 67/04* (2013.01); *A45D 8/008* (2021.01); *A45D 8/36* (2013.01); *C08K 3/34* (2013.01); *C08K 2003/265* (2013.01); *C08L 67/00* (2013.01); *C08L 67/02* (2013.01); *C08L 67/03* (2013.01); *C08L 2201/06* (2013.01); *C08L 2205/02* (2013.01)

(58) Field of Classification Search
None
See application file for complete search history.

(56) References Cited

U.S. PATENT DOCUMENTS

| | | | | |
|---|---|---|---|---|
| 5,216,050 A | * | 6/1993 | Sinclair | C08G 63/08 525/437 |
| 5,252,642 A | * | 10/1993 | Sinclair | C09D 167/04 525/437 |
| 5,494,060 A | * | 2/1996 | Potut | A45D 8/20 132/277 |
| 5,697,388 A | * | 12/1997 | Chang | A45D 8/20 132/277 |
| 6,035,863 A | * | 3/2000 | Mao | A45D 8/20 132/273 |
| 9,232,841 B1 | * | 1/2016 | Hsu | A45D 8/20 |
| 2005/0043462 A1 | * | 2/2005 | Yamada | C08L 67/02 523/210 |
| 2006/0225763 A1 | * | 10/2006 | Lau | A45D 8/20 132/277 |

(Continued)

*Primary Examiner* — Vivian Chen
(74) *Attorney, Agent, or Firm* — Alan D. Kamrath; Karin L. Williams; Mayer & Williams PC

(57) ABSTRACT

A biodegradable hair ornament is made of a composite material comprising 50-90 wt % of polylactic acid, 5-40 wt % of a toughener, and 5-30 wt % of a nucleating agent. The toughener is selected from the group consisting of polyethylene terephthalate, thermoplastic elastomer ester resin, polyester polyol resin, vinyl ester resin, and combinations thereof. The nucleating agent is selected from the group consisting of calcium carbonate, talc, silicon dioxide, mica, and combinations thereof.

8 Claims, 4 Drawing Sheets

(56) References Cited

U.S. PATENT DOCUMENTS

| | | | | |
|---|---|---|---|---|
| 2009/0255552 A1* | 10/2009 | Hsu | ............ | A45D 8/20 |
| | | | | 132/277 |
| 2009/0270530 A1* | 10/2009 | Nakai | ............ | C08K 5/29 |
| | | | | 523/124 |
| 2010/0139687 A1* | 6/2010 | Hsu | ............ | A45D 8/20 |
| | | | | 132/277 |
| 2014/0155528 A1* | 6/2014 | Onoue | ............ | C08K 5/06 |
| | | | | 524/145 |
| 2022/0125175 A1* | 4/2022 | Hsu | ............ | A45D 8/22 |

* cited by examiner

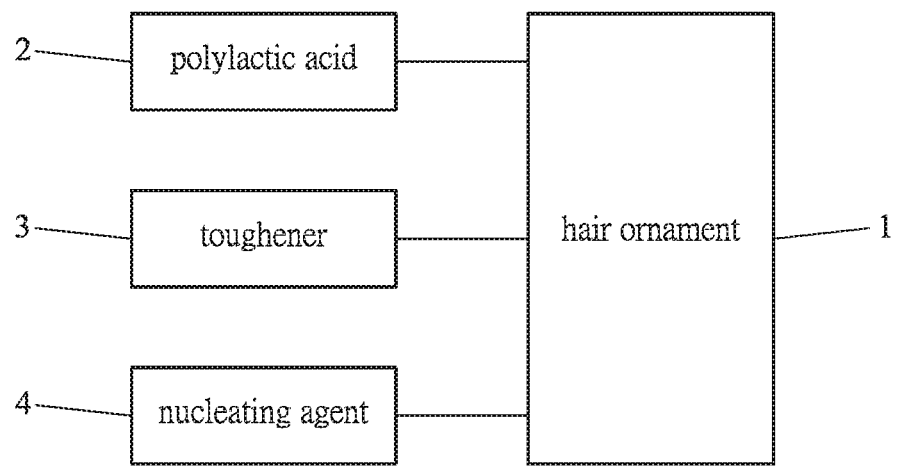
F I G . 1

BIODEGRADABLE HAIR ORNAMENT

BACKGROUND OF THE INVENTION

The present invention relates to a biodegradable hair ornament and, more particularly, to a biodegradable hair ornament with excellent strength.

Conventional hair clips, hair bands, combs, and hair sticks used to make hairstyles and hair ornaments worn on hair are generally made of plastic materials with advantages of easy mass production, easy shaping, and product consistency. Conventional hair ornaments can be made of polycarbonate (PC), polypropylene, or acrylonitrile butadiene styrene (ABS), all of which are not degradable and, thus would pollute the environment when improperly discarded by users. When these materials are treated by conventional garbage incineration, toxic gases harmful to the environment and human health are generated.

To reduce the above environmental issue, biodegradable polylactic acid (PLA) is used to produce hair ornaments. However, PLA has insufficient strength, insufficient toughness, and insufficient elasticity and is not resistant to high temperature. Taking a hair clip as an example, the hair clip generally includes two clips pivotably connected to each other at a pivotal connection, and an elastic element is disposed at the pivotal connection to provide the two clips with a clamping force. However, the hair clip made of polylactic acid has insufficient strength and tends to break at the pivotal connection, resulting in separation of the two clips.

BRIEF SUMMARY OF THE INVENTION

An objective of the present invention is to provide a biodegradable hair ornament with greater strength and greater toughness.

A biodegradable hair ornament according to the present invention is made of a composite material comprising 50-90 wt % of polylactic acid, 5-40 wt % of a toughener, and 5-30 wt % of a nucleating agent. The toughener is selected from the group consisting of polyethylene terephthalate, thermoplastic elastomer ester resin, polyester polyol resin, vinyl ester resin, and combinations thereof. The nucleating agent is selected from the group consisting of calcium carbonate, talc, silicon dioxide, mica, and combinations thereof.

When the product according to the present invention takes shape, the polylactic acid, the toughener, and the nucleating agent polymerize to provide a dense arrangement of molecules, providing a better crystalline density. Furthermore, the toughener increases the toughness and elasticity of the product. Furthermore, the nucleating agent increases the crystalline strength and the heat resistance of the product. Thus, the product is flexible and less likely to break, meeting the requirements of use. Accordingly, when the biodegradable hair ornament according to the present invention is discarded, most ingredients of the polylactic acid can be biodegraded to provide better environmental protection.

In an example, the biodegradable hair ornament includes two clips which are symmetric and made of the composite material. Each of the two clips includes a pressing portion on a top end thereof and a curved clamping portion on a lower portion thereof. The top end of each of the two clips includes an inner side having a pivotal portion. The pivotal portions of the two clips are pivotably connected to each other. The biodegradable hair ornament further includes an elastic element abutting against the two clips to provide a clamping force to the two clips.

In an example, each of the two clips includes a first portion and a second portion. The first portion essentially includes the pressing portion and the pivotal portion. The second portion essentially includes the curved clamping portion. The weight percentage of the polylactic acid of the first portion is smaller than the weight percentage of the polylactic acid of the second portion. Thus, the hair clip is prevented from breaking at the pivotal connection to prolong the service life.

In an example, the first portion includes 50-65 wt % of polylactic acid, 20-40 wt % of the toughener, and 10-30 wt % of the nucleating agent.

In an example, the second portion includes 70-90 wt % of polylactic acid, 5-20 wt % of the toughener, and 5-15 wt % of the nucleating agent.

In an example, the elastic element is made of the composite material, and the weight percentage of the polylactic acid of the elastic element is smaller than the weight percentage of the polylactic acid of each of the two clips.

In an example, the elastic element is made of the composite material, and the weight percentage of the polylactic acid of the elastic element is smaller than the weight percentage of the polylactic acid of the first portion.

In another example, the elastic element is made of a metal material.

In an example, some or all components of the biodegradable hair ornament are made of the composite material by injection molding, and are then heated at 110-130° C. for 30-60 seconds.

The present invention will become clearer in light of the following detailed description of illustrative embodiments of this invention described in connection with the drawings.

DESCRIPTION OF THE DRAWINGS

FIG. 1 is a diagrammatic view illustrating ingredients of a biodegradable hair ornament according to the present invention.

DETAILED DESCRIPTION OF THE INVENTION

Where used in the various figures of the drawings, the same numerals designate the same or similar parts. A biodegradable hair ornament 1 according to the present invention is made of a composite material comprising 50-90 wt % of polylactic acid 2, 5-40 wt % of a toughener 3, and 5-30 wt % of a nucleating agent 4. The toughener 3 is selected from the group consisting of polyethylene terephthalate, thermoplastic elastomer ester resin, polyester polyol resin, vinyl ester resin, and combinations thereof.

The nucleating agent 4 is selected from the group consisting of calcium carbonate, talc, silicon dioxide, mica, and combinations thereof.

Some or all components of the biodegradable hair ornament 1 are made of the composite material by injection molding using a mold. During formation, the mold is at a temperature of 110-130° C. to stabilize the crystallization of the product. Furthermore, after formation, the product is heated at 110-130° C. for 30-60 seconds to release the inner stress of the product while increasing the strength of the product.

When the product according to the present invention takes shape, the polylactic acid 2, the toughener 3, and the nucleating agent 4 polymerize to provide a dense arrangement of molecules, providing a better crystalline density. Furthermore, the toughener 3 increases the toughness and elasticity of the product. Furthermore, the nucleating agent 4 increases the crystalline strength and the heat resistance of the product. Thus, the product is flexible and less likely to break, meeting the requirements of use. Accordingly, when the biodegradable hair ornament 1 according to the present invention is discarded, most ingredients of the polylactic acid 2 can be biodegraded to provide better environmental protection.

Figure 2:
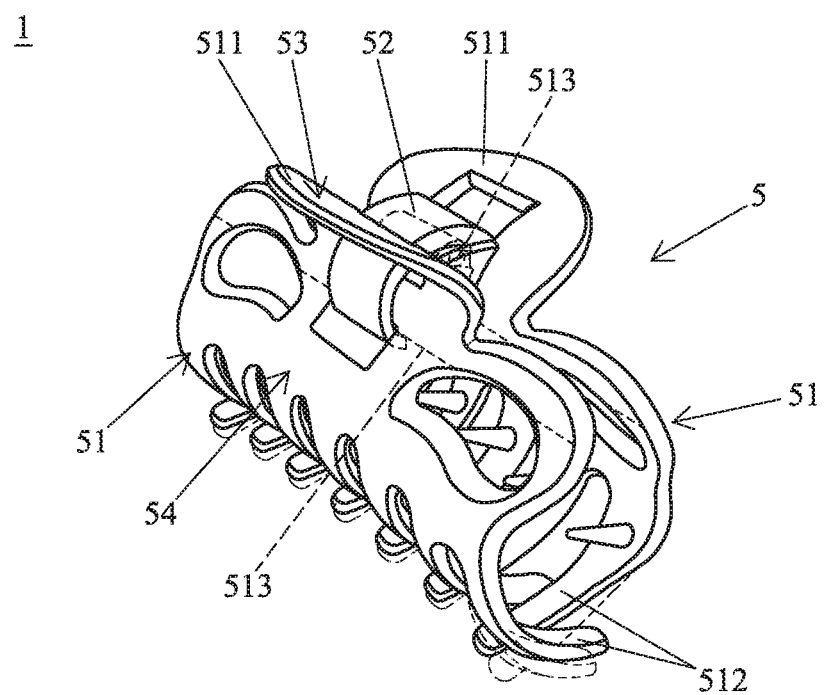
FIG. 2 is a perspective view of a biodegradable hair ornament of a first example according to the present invention.

With reference to FIGS. 1 and 2, the composite material according to the present invention can be used to produce a biodegradable hair ornament 1 in the form of a hair clip 5. The hair clip 1 includes two clips 51 which are symmetric and an elastic element 52. Each of the two clips 51 includes a pressing portion 511 on a top end thereof for manual pressing and a curved clamping portion 512 on a lower portion thereof. The top end of each of the two clips 51 includes an inner side having a pivotal portion 513. The pivotal portions 513 of the two clips 51 are pivotably connected to each other. The elastic element 52 abuts against the two clips 51 to provide a clamping force to the two clips 51. The toughener 3 and the nucleating agent 4 increase the toughness and the strength of the product according to the present invention, preventing the hair clip 51 from breaking at the pivotal connection and prolonging the service life of the product. Furthermore, the weight percentage of the polylactic acid 2 of the elastic element 52 is smaller than the weight percentage of the polylactic acid 2 of each of the two clips 52. Thus, the biodegradable hair ornament 1 according to the present invention can degrade completely when discarded.

Each of the two clips 51 of the hair clip 5 includes a first portion 53 and a second portion 54. The first portion 53 essentially includes the pressing portion 511 and the pivotal portion 513. The second portion 54 essentially includes the curved clamping portion 512. During formation of each of the two clips 51, the material for forming the first portion 53 and the second portion 54 is filled into a mold (not shown) for integral formation. The weight percentage of the polylactic acid 2 of the first portion 53 is smaller than the weight percentage of the polylactic acid 2 of the second portion 54. Furthermore, the weight percentage of the polylactic acid 2 of the elastic element 52 is smaller than the weight percentage of the polylactic acid 2 of the first portion 53.

The first portion 53 includes 50-65 wt % of polylactic acid 2, 20-40 wt % of the toughener 3, and 10-30 wt % of the nucleating agent 4. The second portion 54 includes 70-90 wt % of polylactic acid 2, 5-20 wt % of the toughener 3, and 5-15 wt % of the nucleating agent 4. The elastic element 52 includes 50-55 wt % of polylactic acid 2, 30-40 wt % of the toughener 3, and 10-30 wt % of the nucleating agent 4. The first portion 53 can have greater strength and greater toughness than the second portion 54 to reliably prevent the pressing portion 511 and the pivotal portion 513 from deforming and breaking. Furthermore, the elastic element 52 can have greater strength and greater toughness than the first portion 53 and the second portion 54 to prolong the service life of the hair clip 5.

Figure 3:
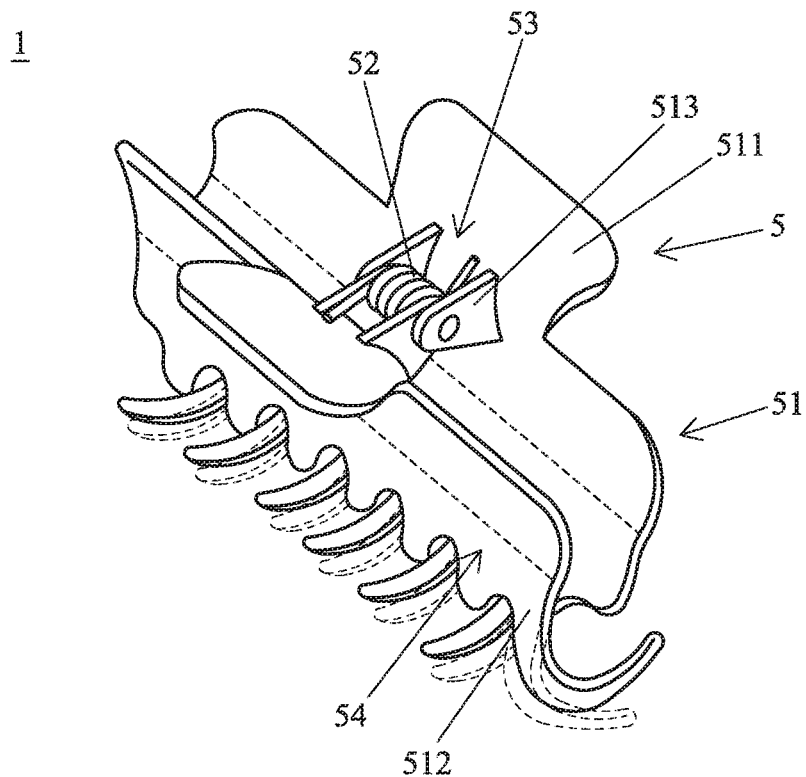
FIG. 3 is a perspective view of a biodegradable hair ornament of a second example according to the present invention.

FIG. 3 shows a second example of the present invention similar to the first example except for that the elastic element 52 is made of a metal material. Although the elastic element 52 cannot degrade naturally, the two clips 51, which are the essential parts of the biodegradable hair ornament 1, can degrade naturally to provide better environmental protection.

Figure 4:
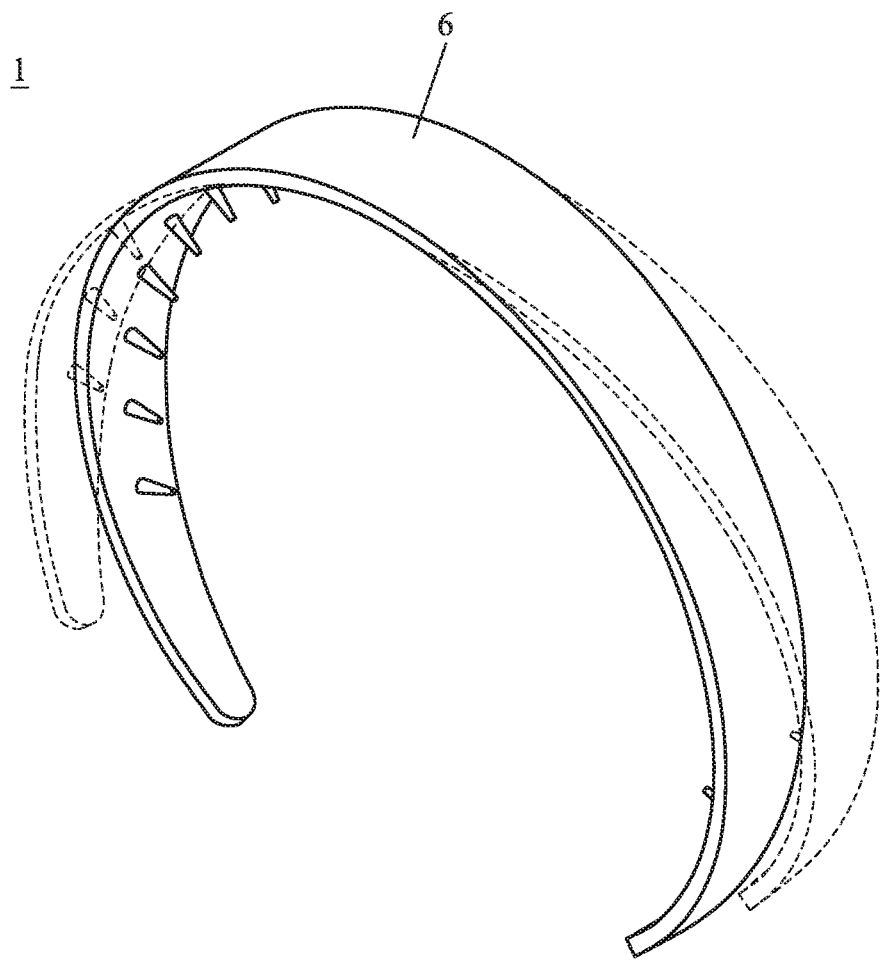
FIG. 4 is a perspective view of a biodegradable hair ornament of a third example according to the present invention.

FIG. 4 shows a third example of the present invention in the form of a hair band 6. It is noted that the biodegradable hair ornament 1 can also be in the form of a hair comb, a hair stick, or the like. Thus, most ingredients of the biodegradable hair ornament 1 according to the present invention, when discarded, can degrade naturally to provide better environmental protection.

Although specific embodiments have been illustrated and described, numerous modifications and variations are still possible without departing from the scope of the invention. The scope of the invention is limited by the accompanying claims.

The invention claimed is:

1. A biodegradable hair ornament made of a composite material comprising 50-90 wt % of polylactic acid, 5-40 wt % of a toughener, and 5-30 wt % of a nucleating agent, wherein the toughener is selected from the group consisting of polyethylene terephthalate, thermoplastic elastomer ester resin, polyester polyol resin, vinyl ester resin, and combinations thereof, and wherein the nucleating agent is selected from the group consisting of calcium carbonate, talc, silicon dioxide, mica, and combinations thereof, wherein the biodegradable hair ornament includes two clips which are symmetric and made of the composite material, wherein each of the two clips includes a pressing portion on a top end thereof and a curved clamping portion on a lower portion thereof, wherein the top end of each of the two clips includes an inner side having a pivotal portion, wherein the pivotal portions of the two clips are pivotably connected to each other, and wherein the biodegradable hair ornament further includes an elastic element abutting against the two clips to provide a clamping force to the two clips, and wherein each of the two clips includes a first portion and a second portion, wherein the first portion essentially includes the pressing portion and the pivotal portion, wherein the second portion essentially includes the curved clamping portion, and wherein the weight percentage of the polylactic acid of the first portion is smaller than the weight percentage of the polylactic acid of the second portion.

2. The biodegradable hair ornament as claimed in claim 1, wherein the first portion and the second portion are integrally formed.

3. The biodegradable hair ornament as claimed in claim 1, wherein the first portion includes 50-65 wt % of polylactic acid, 20-40 wt % of the toughener, and 10-30 wt % of the nucleating agent.

4. The biodegradable hair ornament as claimed in claim 1, wherein the second portion includes 70-90 wt % of polylactic acid, 5-20 wt % of the toughener, and 5-15 wt % of the nucleating agent.

5. The biodegradable hair ornament as claimed in claim 1, wherein the elastic element is made of the composite material, and wherein the weight percentage of the polylactic acid of the elastic element is smaller than the weight percentage of the polylactic acid of each of the two clips.

6. The biodegradable hair ornament as claimed in claim 1, wherein the elastic element is made of the composite material, and wherein the weight percentage of the polylactic acid of the elastic element is smaller than the weight percentage of the polylactic acid of the first portion.

7. The biodegradable hair ornament as claimed in claim 1, wherein the elastic element is made of a metal material.

8. The biodegradable hair ornament as claimed in claim 1, wherein some or all components of the biodegradable hair ornament are made of the composite material by injection molding, and are then heated at 110-130° C. for 30-60 seconds.

\* \* \* \* \*